Patented Apr. 24, 1951

2,550,342

UNITED STATES PATENT OFFICE 2,550,342

PROCESS OF VULCANIZING "BUTYL" RUBBER

Arvel O. Franz, Cartersville, Ga., assignor to Chemical Development Co., Cartersville, Ga., a corporation of Georgia No Drawing. Application April 29, 1947, Serial No. 744,778

2 Claims. (Cl. 260—79.5)

This invention relates to an improved process of vulcanizing rubber of the character described in the United States patents to Thomas, No. 2,356,127 and No. 2,356,128, granted August 22, 1944, and popularly termed "butyl rubber."

"Butyl rubber" is described in the Thomas patents as a synthetic, solid, plastic, hydrocarbon interpolymer of a major proportion of an isoolefin having less than 8 carbon atoms per molecule, e. g., isobutylene and isoheptylene, with a minor proportion of a conjugated aliphatic diolefin having 4 to 8, inclusive, carbon atoms per molecule, e. g., butadiene 1,3 and octadiene 1,3, the said polymer being characterized by a low unsaturation below an iodine number of 50, a molecular weight above 15,000 and reactivity with sulfur to yield a product of increased elasticity.

The invention is particularly concerned with accelerating the vulcanization process and obtaining a vulcanizate which combines a desirable low modulus of elasticity with good tear resistance and low permanent set.

The process comprises introducing in the rubber mix, which may include conventional vulcanizing agents, accelerators and activators, about .5 to 1.5 parts of morphyl morpholyl dithiocarbamate per 100 parts of hydrocarbon interpolymer. The structural formula of this compound is:

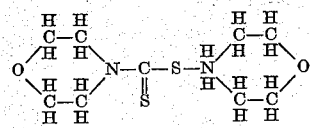

The results are surprising in view of the known insolubility of this compound in other types of natural and synthetic rubber. That is to say, with such other types of rubbers, this accelerator will assist curing but due to lumpiness, irregularity of cure, and poor physical properties it is generally objectionable.

The accelerator may be prepared in several ways as, for instance,

PROCESS 1

Morpholine dissolved in water is charged through a flow-type, continuous reactor equipped for vigorous emulsifying type agitation. Carbon disulfide is added to the reaction medium at the entrance to the reactor. The sparingly soluble morphyl morpholyl dithiocarbamate is filtered off and the mother liquor containing excess morpholine and some dissolved dithiocarbamate is recirculated, and the process repeated.

PROCESS 2

Alternately, morpholine is added to a solution of $CS_2$ in a chlorinated hydrocarbon solvent, e. g., ethylene dichloride with vigorous agitation in a flow-type continuous reactor. The dithiocarbamate produced is filtered off and the chlorinated hydrocarbon recirculated. The chlorinated hydrocarbons have a special advantage in that they eliminate the extreme safety hazards involved in the handling of carbon disulfide.

The accelerator prepared by either of the foregoing processes is mixed with the butyl rubber and the other compounding ingredients and upon vulcanizing in the usual manner, the new and successful vulcanization product is obtained.

Example

| | Parts by weight |
|---|---|
| GR-I | 100 |
| Zinc oxide | 5 |
| Stearic acid | 1 |
| Carbon black | 40 |
| Sulfur | 2.0 |
| Morphyl morpholyl dithiocarbamate | 1.5 |

| Cure Time at 310° F. | Tensile Str., lbs./in.² | Elongation Per Cent | Young's Modulus of Elasticity at 300% elongation |
|---|---|---|---|
| 15 min | 2,500 | 950 | 350 |
| 30 min | 2,550 | 800 | 440 |
| 45 min | 2,470 | 720 | 525 |
| 60 min | 2,360 | 680 | 640 |
| 125 min | 2,210 | 600 | 790 |

The above is an example of a typical butyl rubber mix and, of course, the invention is equally operative with other mixes.

I claim:

1. The process which comprises vulcanizing a vulcanizable mixture containing a vulcanizing agent, morphyl morpholyl dithiocarbamate and a synthetic, solid, plastic, hydrocarbon interpolymer of a major proportion of an isoolefin having less than 8 carbon atoms per molecule with a minor proportion of a conjugated aliphatic diolefin having 4 to 8, inclusive, carbon atoms per molecule, the said polymer being characterized by a low unsaturation below an iodine number of 50, a molecular weight above 15,000 and reactivity with sulfur to yield a product of increased elasticity, the dithiocarbamate being present in amount of .5 to 1.5 parts per hundred parts of the hydrocarbon interpolymer.

2. The vulcanizate obtained by the process of claim 1.

ARVEL O. FRANZ.

REFERENCES CITED

The following references are of record in the file of this patent:

UNITED STATES PATENTS

| Number | Name | Date |
|---|---|---|
| 1,805,103 | Powers | May 12, 1931 |
| 2,356,128 | Thomas et al. | Aug. 22, 1944 |